INVENTOR.
EUGENE SEID
BY
William R. Lane
ATTORNEY

*INVENTOR.*
EUGENE SEID
*BY*
William R. Lane
ATTORNEY

INVENTOR.
EUGENE SEID
BY William R. Lane
ATTORNEY 2,727,194

DOUBLE DIGITAL SERVO

Eugene Seid, Los Angeles, Calif., assignor to North American Aviation, Inc.

Application October 16, 1951, Serial No. 251,572

5 Claims. (Cl. 318—28)

This invention relates to digital servos, and in particular to an improvement in the digital servo described in Patent No. 2,537,427 issued January 9, 1951 to Eugene Seid and Lester L. Kilpatrick.

In the digital servo disclosed in the above patent a series of summing resistors are employed to achieve a voltage proportional to the digital number stored in the binary counter. When the number stored in the counter is very large a slight drift in the value of a summing resistor connected to one of the higher stages of the counter introduces as much voltage into the summing network as does the introduction of an additional number of pulses into a lower stage in the counter. For instance, referring to Fig. 7 of the patent, a slight drift in the value of resistances 75 or 76 due to temperature change or other causes, would contribute as much change in the output of summing networks 16 or 17 as would the counting of a few additional pulses by the first stage of the counter. When very large numbers are stored in the counter it can therefore be seen that the accuracy of the counter, in terms of digits, may suffer due to drift in the values of these summing resistances. This error never becomes very large, since the immediate effect of a slight error voltage is a rotation of the motor which is driven in response to the voltage output of the binary counter, which rotation is sensed and is reintroduced into the counter as a series of pulses. The net result, however, is that the output shaft of the servo slowly drifts back and forth about a mean correct position.

This invention contemplates the elimination of this slight drift and the provision of means whereby the output voltage is relatively independent of the drift in value of the summing resistors.

It is an object of this invention to provide a digital servo of improved accuracy.

It is another object of this invention to provide a digital servo having direction sense only for large numbers.

It is another object of this invention to provide a digital servo having direction sense only for large numbers and proportionality control only for small numbers.

It is another object of this invention to provide a digital servo adapted to handle large values of input data with the use of relatively imprecise circuit components.

It is another object of this invention to provide a digital servo having direction sense only.

Other objects of invention will become apparent from the following description taken in connection with the accompanying drawings, in which Fig. 1 is a schematic diagram of the invention;

Figure 4:
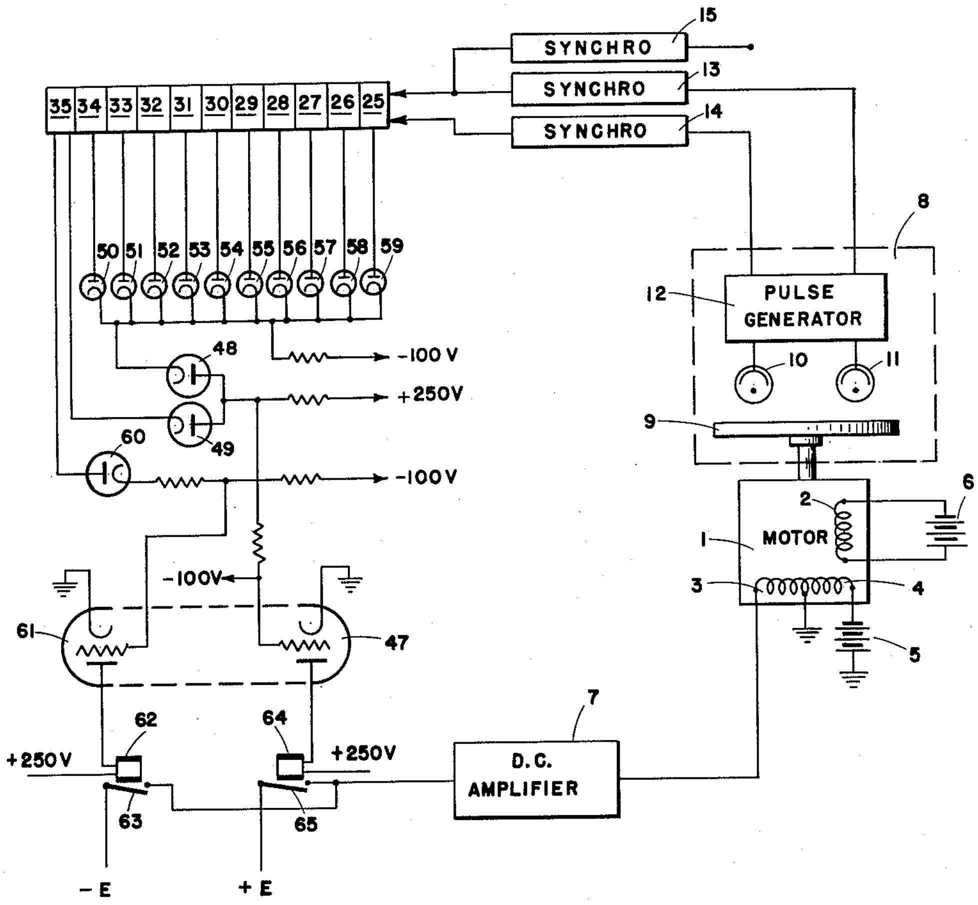

And Fig. 4 is a schematic diagram of a second embodiment of the invention.

Figure 1:
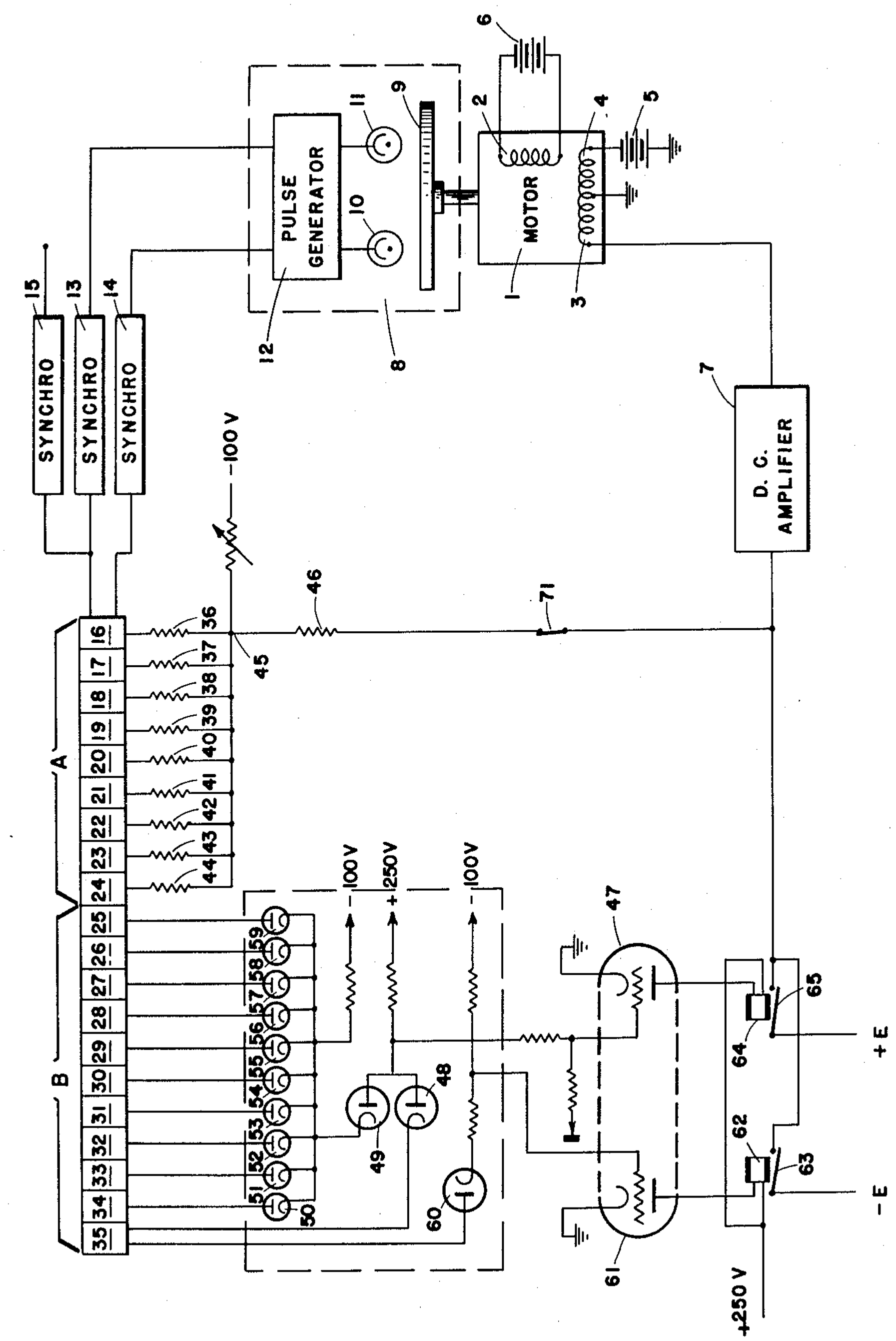

Referring now to the drawings, and in particular to Fig. 1, there is shown a motor 1 having armature winding 2, and field windings 3, and 4 energized, as shown, in part by current sources 5 and 6 and in part by the output of amplifier 7. Motor 1 drives a directional pulse tachometer 8 having a disc 9, photocells 10 and 11, and a pulse generator 12 similar to that indicated in Fig. 9 of Patent No. 2,537,427. Pulse generator 12 is connected to synchronizers 13 and 14 of the type disclosed in Patent No. 2,552,968 for "Random Pulse Synchronizer" issued to Walter Hochwald on May 15, 1951. The output of synchronizer 13, as well as the outputs of synchronizers 14 and 15, are fed to the input of counter element 16 which is similar to the counter stages shown in Fig. 7 of the patent, and which is shown in detail in Fig. 2. Counter elements 17, 18, 19, 20, 21, 22, 23, and 24 are connected together in the manner indicated in connection with Fig. 7 of Patent No. 2,537,427 so that as a number of pulses are introduced into element 16, carryover occurs to the other successive stages of the counter. The output of counter element 24 is connected likewise to counter element 25, and on through counter elements 26, 27, 28, 29, 30, 31, 32, 33, 34, and 35. Summing resistors 36, 37, 38, 39, 40, 41, 42, 43, and 44 are connected to produce a voltage in response to the condition of the bistable multivibrator in each counter element so that the voltage at junction 45 is proportional to the number stored in the first nine elements of the counter. This voltage is fed through resistance 46 to the input of amplifier 7, which in turn drives motor 1 in a direction and by an amount proportional to the number contained in the first nine stages of the counter.

Zero for the counter is chosen as that condition in which elements 24 and 35 are in "On" condition. Should the number stored in the counter exceed $2^8$, carryover occurs to counter element 25 and its adjacent counter elements. If counter element 35 is in "On" condition, indicating that it has received a pulse, and if, in addition, any of counter elements 25—34 are in "On" condition, a positive increment of voltage appears upon the grid of triode 47 by virtue of conduction which occurs through diode 48, diode 49, and any one or more or any combination of diodes 50, 51, 52, 53, 54, 55, 56, 57, 58, or 59, which are connected to one of the plates of each of the bistable multivibrators in each one of the counter elements. Positive bias voltage is furnished, as indicated in Fig. 1, to produce this result. Should counter element 35 be in "Off" condition, diode 60 conducts, providing a positive increment of voltage to triode 61 and causing relay 62 to close switch 63. Conduction through triode 47 likewise causes relay 64 to function, closing switch 65. When switch 63 is closed a large constant negative voltage is supplied to amplifier 7 overriding any input thereto through resistance 46 and causing motor 1 to be rotated at full speed in one direction. Likewise, motor 1 is caused to operate at full speed in the opposite direction when switch 65 is closed, supplying to amplifier 7 a large positive voltage.

In operation, the device functions in a manner similar to that disclosed in Patent No. 2,537,427 insofar as numbers less than $2^8$ are concerned. However, for numbers in excess of $2^8$, section B of the counter functions, providing voltage for the operation of the motor. The device is then independent of the operation of section A. If a small number is introduced into the counter through synchronizer 15, the counter stores this number, supplying a voltage at junction 45 proportional to the number stored in the counter, which voltage is communicated to amplifier 7, and which in turn drives motor 1 until the number in the counter has been counted down in the manner described in Patent No. 2,537,427. For such a small number, one or more of counter elements 16 through 24 would be in "On" condition, as well as counter element 35. In this condition it can be seen that while diode 48 would be conducting, diode 49 would not be conducting, hence triode 47 remains at cutoff, and relay 64 is unenergized. However, should one of elements 25 through 34 be in "On" condition—thus indicating a number stored in the counter larger than $2^8$—diode 49 conducts, raising the voltage on the grid of triode 47 above cutoff and energizing relay 64. Switch 65 is therefore closed, and a constant voltage is applied to amplifier 7, causing motor 1 to turn in the sense required to reduce the number stored in the counter. Thus, the counter has a capacity of $2^{18}$ and the same precision as though it had a capacity of merely $2^8$. The servo thus operates as though it were nonlinear while the number stored in the counter is above $2^8$, and operates in a strictly linear fashion when the number stored in the counter has been reduced to $2^8$ or less.

Should element 35 be in "Off" condition, it is apparent that a negative number is stored in the counter. When a negative number is stored in the counter, of course, a negative voltage must be applied to the motor to achieve the correct directional response. When counter 35 is in "Off" condition, therefore, diode 60 connected to the opposite triode in the bistable multivibrator of counter element 35 from that to which diode 48 is connected conducts, raising the voltages on the grid of triode 61 above cutoff, energizing relay 62 and closing switch 63 so that a large negative voltage is applied to amplifier 7. Due to the presence of isolating resistor 46, any voltage contribution made by the summing resistors of the first eight stages of the counter is blotted out by the large negative voltage contributed through switch 63. The motor, therefore, turns until a positive number is counted into the counter to count down the negative number stored therein. Since element 35 is restored to "On" condition, indicating that a positive number is again stored in the counter, the operation of the device continues as described above until the rotation of motor 1 again exactly corresponds to the number originally introduced into the counter.

Alternatively, Section A of the counter may be omitted, with the pulse input to the counter applied directly to element 25. This arrangement of the device is shown in Fig. 4. When a number of pulses is introduced through synchronizer 15 to counter element 25 the counter immediately responds by counting the pulses, and since for a positive number less than the full capacity of the counter, element 35 will be in "On" condition, the grid of triode 47 is raised to a potential above cutoff so that the triode conducts, energizing relay 64 and closing switch 65. Motor 1 then turns until the number in the counter is reduced to zero. Since the motor must be assumed to have some inertia it will be seen that if a large number is introduced through synchronizer 15, motor 1 will overshoot and will introduce into the counter a negative number, at which time triode 61 will be caused to conduct—triode 47 meanwhile ceasing to conduct by virtue of the fact that counter element 35 is in "Off" condition. Then switch 63 will be closed, causing the motor to turn in the opposite direction until the negative number introduced into the counter has been counted down. In some servo applications this relatively crude control is satisfactory, especially where auxiliary means such as viscous damping may be used to reduce the amount by which motor 1 overshoots, to a tolerable value.

Figure 2:
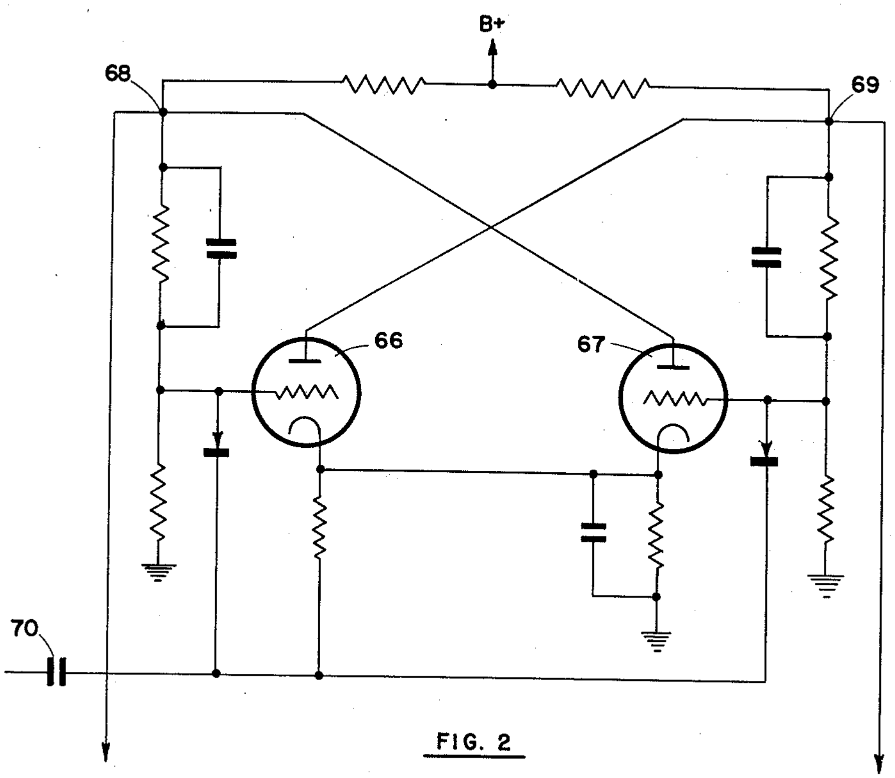
Fig. 2 is a detailed circuit diagram of a part of the invention.

Referring now to Fig. 2, there is shown a bistable multivibrator of the type employed in this invention and in the device described in Patent No. 2,537,427. This bistable multivibrator is characterized by having triodes 66 and 67 which conduct alternately so that output junctions 68 and 69 are either at a relatively high voltage such as 100 or 120 v. or at a relatively low voltage such as 60 or 80 v. Incoming pulses furnished through condenser 70 from a preceding stage of the counter, or from one of the synchronizers in the case of counter 25, cause the bistable multivibrator to operate with triode 66 conducting upon the application of the first pulse, and triode 67 conducting upon the application of the second pulse, and so on. In stages 25 through 35 of the counter, output junction 69 is typically connected to one of diodes 48 or diodes 50 through 59. Output junction 68 is left unconnected except in the case of element 35 in which it is connected to diode 60 as shown in Fig. 1. In the case of counter elements 16 through 24, on the other hand, the connection is as shown in Fig. 7 of Patent No. 2,537,427, except that no negative summing network is employed.

Figure 3:
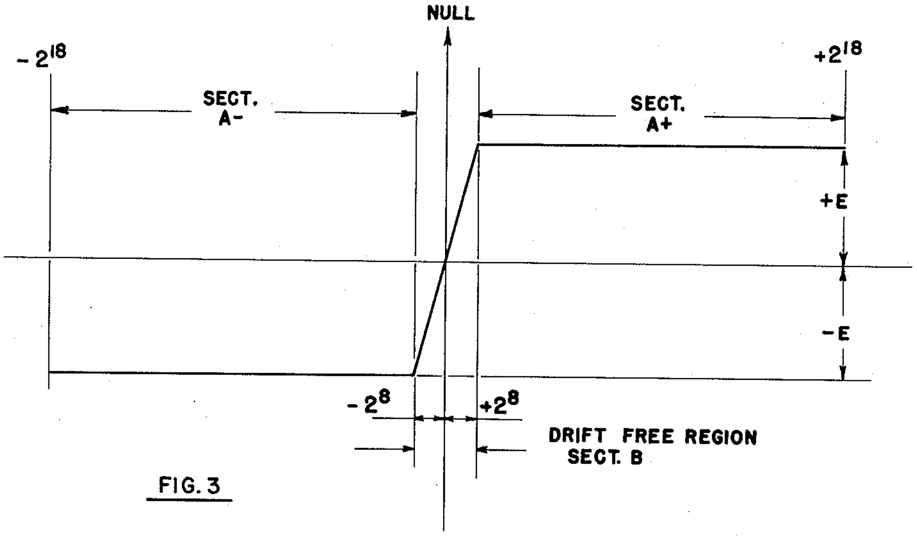
Fig. 3 is a graph showing the operation of the invention.

Referring now to Fig. 3, there is shown a graph of the control voltage applied to motor 1 plotted as ordinates against the number in the counter plotted as abscissa. It can be seen that for very large numbers the voltage applied to the motor is constant at E and that the voltage is independent of the number in the counter, whereas for a relatively small number the voltage is proportional to the number in the counter. This applies both for positive and negative numbers.

Although the invention has been described and illustrated in detail, it is to be clearly understood that the same is by way of illustration and example only and is not to be taken by way of limitation, the spirt and scope of this invention being limited only by the terms of the appended claims.

I claim:

1. Means for rotating a shaft by an amount proportional to a number of input electrical pulses comprising a reversible motor for rotating said shaft, tachometer means for producing a number of electrical pulses corresponding in magnitude and sign to the magnitude and direction of rotation of said motor, counter means for continuously counting with regard to sign said input electrical pulses and said tachometer electrical pulses, and switch means responsive to the sign of the content of said counter for energizing said motor with a substantially constant E. M. F. to cause it to rotate in a direction corresponding to the sign of the number counted by said counter means to thereby cause said shaft to describe a rotation proportional to the number of said input electrical pulses.

2. Means for converting to a directional shaft rotation a number of pulses having sign comprising means for counting said pulses, diode switching means connected to said counting means for producing a constant voltage of polarity indicative of the sign of the sum of said counted pulses, means for producing a shaft rotation having a direction corresponding to said voltage polarity, and means for introducing into said counting means a number of pulses proportional to said shaft rotation and corresponding in sign to the direction of rotation thereof to thereby convert said pulses into a shaft rotation.

3. Means for producing a net angular displacement of a shaft proportional to a number of electrical pulses in a direction corresponding to the sign of said pulses comprising a counter receiving both positive and negative pulses and storing a number equivalent to the algebraic sum thereof, switching means operable by said counter for producing a constant voltage of polarity corresponding to the algebraic sign of said stored number, means for angularly displacing said shaft in a direction corresponding to the polarity of said voltage, and means for introducing into said counter a number of pulses proportional to the angular displacement of said shaft having sign corresponding to the direction of said displacement to thereby angularly displace said shaft by an amount proportional to said number of electrical pulses.

4. Means for producing an angular displacement of a shaft proportional to a number of electrical pulses in a direction corresponding to the sign of said pulses comprising a binary counter for algebraically summing all pulses introduced into it, means responsive to any number stored in said counter larger than a predetermined number for producing a constant voltage of sign corresponding to said number, means responsive to any number stored in said counter smaller than said predetermined number for producing a voltage proportional to said number and corresponding thereto in sign and for rendering said constant voltage producing means inoperative, a motor connected to said shaft and connected to be driven by either of said voltages in a direction corresponding to the sign thereof, and tachometer means driven by said motor for introducing into said counter a number of pulses proportional to the angular displacement of said shaft and corresponding in sign to the direction of rotation thereof to thereby produce an angular displacement of said shaft proportional to said number of electrical pulses.

5. Means for producing a net angular displacement of a shaft substantilaly proportional to a number of electrical pulses in a direction corresponding to the sign of said pulses comprising a counter receiving both positive and negative pulses and storing a number equivalent to the algebraic sum thereof, means including a constant voltage source and switch means operable by said counter for producing a constant magnitude signal of polarity corresponding to the sign of said algebraic sum, means for angularly displacing said shaft in a direction corresponding to the polarity of said signal, and means for introducing into said counter pulses having sign corresponding to the direction of displacement of said shaft to thereby angularly displace said shaft by an amount substantially proportional to said number of electrical pulses.

References Cited in the file of this patent

UNITED STATES PATENTS

| | | |
|---|---|---|
| 2,537,427 | Seid et al. | Jan. 9, 1951 |
| 2,566,831 | Grosdoff | Sept. 4, 1951 |
| 2,630,552 | Johnson | Mar. 3, 1953 |
| 2,685,054 | Brenner et al. | July 27, 1954 |